(12) United States Patent
Hoshi et al.

(10) Patent No.: US 10,112,274 B2
(45) Date of Patent: Oct. 30, 2018

(54) MACHINE TOOL

(71) Applicant: DMG MORI CO., LTD., Yamatokoriyama-shi (JP)

(72) Inventors: Takashi Hoshi, Yamatokoriyama (JP); Ryosuke Yasumura, Yamatokoriyama (JP); Hiromitsu Nakaoka, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 4 days.

(21) Appl. No.: 15/200,585

(22) Filed: Jul. 1, 2016

(65) Prior Publication Data

US 2017/0008139 A1  Jan. 12, 2017

(30) Foreign Application Priority Data

Jul. 7, 2015  (JP) .................................. 2015-135950

(51) Int. Cl.
*B23Q 1/01* (2006.01)
*B23Q 3/157* (2006.01)

(52) U.S. Cl.
CPC .............. *B23Q 1/015* (2013.01); *B23Q 1/017* (2013.01); *B23Q 3/15733* (2013.01); *Y10T 409/30896* (2015.01); *Y10T 409/309576* (2015.01)

(58) Field of Classification Search
CPC ................................. B23Q 1/015; B23Q 1/017
See application file for complete search history.

(56) References Cited

U.S. PATENT DOCUMENTS 3,998,127 A * 12/1976 Romeu ..................... B23C 1/14
                                                                         408/234
6,679,659 B1    1/2004 Lasch et al.
2002/0164222 A1  11/2002 Sato et al.

FOREIGN PATENT DOCUMENTS

| DE | 10 2004 034 873 B3 | 9/2005 |
| EP | 2 921 253 A1 | 9/2015 |
| JP | 55-69008 | 5/1980 |
| JP | 2002-326137 | 11/2002 |
| JP | 2003-519577 | 6/2003 |
| WO | WO 2014/061210 A1 | 4/2014 |

* cited by examiner

*Primary Examiner* — Alan Snyder
(74) *Attorney, Agent, or Firm* — Oblon, McClelland, Maier & Neustadt, L.L.P.

(57) ABSTRACT

A horizontal machining center serving as a machine tool includes: a bed; a front-side guide rail shaped to extend linearly along an upper surface of the bed and attached to the bed; and a column provided on the upper surface of the bed and fixed to the bed. The column has a facing portion arranged to face an end of the front-side guide rail in an X-axis direction in which the front-side guide rail linearly extends. The facing portion is provided with a hole through which the front-side guide rail can be inserted. By such a configuration, a machine tool with excellent workability during removal of an elongate body is provided.

4 Claims, 6 Drawing Sheets

MACHINE TOOL

BACKGROUND OF THE INVENTION

Field of the Invention

The present invention relates to a machine tool.

Description of the Background Art

Japanese Patent Laying-Open No. 55-69008 discloses a shape inspection apparatus intended to minutely, precisely, and automatically inspect the entire machined surface of a workpiece. The shape inspection apparatus disclosed in Japanese Patent Laying-Open No. 55-69008 includes: a main frame; a moving frame provided on an upper surface of the main frame and being movable in the x-axis direction; and a carriage used for a contact detector, provided on the main frame and being movable in the y-axis direction.

SUMMARY OF THE INVENTION

The shape inspection apparatus disclosed in the above Japanese Patent Laying-Open No. 55-69008 includes a guide having a linearly extending shape as a guide mechanism for guiding the moving frame in the x-axis direction and guiding the carriage in the y-axis direction. According to the machine tool having an elongate body like such a guide, excellent workability is demanded during removal of the elongate body that requires maintenance.

Thus, in order to solve the above-described problems, an object of the present invention is to provide a machine tool that is excellent in workability during removal of an elongate body.

A machine tool according to the present invention includes: a base member having a main surface; an elongate body shaped to extend linearly along the main surface and attached to the base member; and a structure body provided on the main surface and fixed to the base member. The structure body has a facing portion arranged to face an end of the elongate body in a prescribed direction in which the elongate body linearly extends. The facing portion is provided with a hole through which the elongate body can be inserted.

According to the present invention, a machine tool exhibiting excellent workability during removal of an elongate body can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
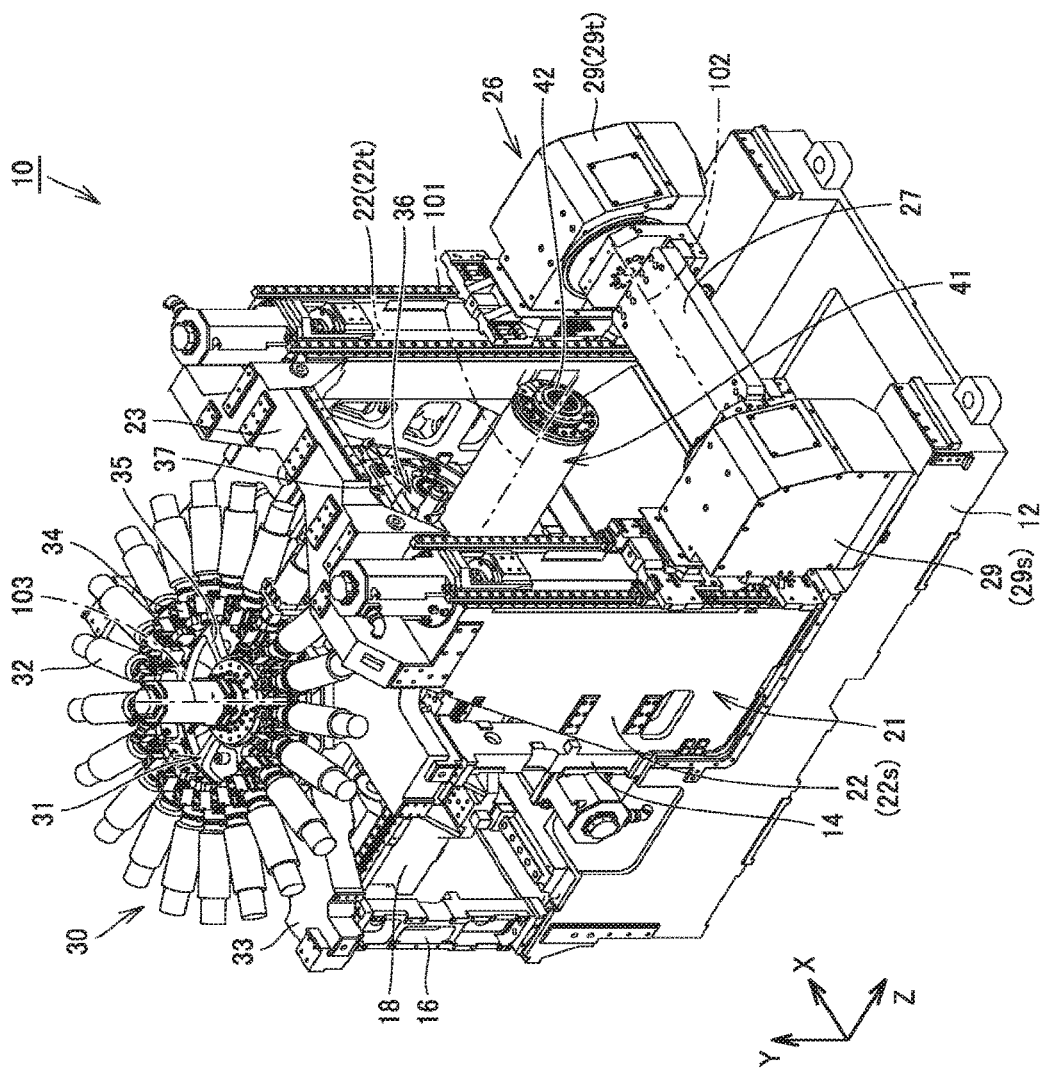
FIG. 1 is a perspective view showing a horizontal machining center according to an embodiment of the present invention.

Embodiments of the present invention will be hereinafter described with reference to the accompanying drawings, in which the same or corresponding components are designated by the same reference characters.

FIG. 1 is a perspective view showing a horizontal machining center according to an embodiment of the present invention. FIG. 1 shows, in perspective, a cover body exhibiting an external appearance of the horizontal machining center for showing the internal structure of this horizontal machining center.

Referring to FIG. 1, the basic structure of a horizontal machining center 10 in the present embodiment will be first hereinafter described. Horizontal machining center 10 includes a bed 12, a column 21, a saddle 18, a spindle head 41, and a table 26.

Bed 12 serves as a base member on which column 21, saddle 18 and the like are mounted. This bed 12 is placed on the installation plane in a factory and the like.

Column 21 is attached to bed 12 and fixed thereto. Column 21 is entirely formed in a portal shape that is vertically arranged on the upper surface of bed 12.

More specifically, column 21 is formed of components including a side portion 22 (22s, 22t) and a top portion 23. Side portion 22 is disposed so as to stand upright from the upper surface of bed 12 in the vertically upward direction. Side portions 22s and 22t are spaced apart from each other in the X-axis direction that is parallel with the horizontal direction. Top portion 23 is disposed so as to extend across side portions 22s and 22t in the X-axis direction.

Basically, the mechanical configuration of horizontal machining center 10 is bilaterally symmetrical with respect to the center in the X-axis direction. In the present embodiment, components designated by reference numbers with suffixes "s" and "t" constitute a pair of components corresponding to this bilateral symmetry.

Saddle 18 is attached to bed 12. Saddle 18 is provided so as to be slidable in the X-axis direction relative to bed 12. A spindle head 41 is attached to saddle 18. Spindle head 41 extends toward table 26 to pass through the space surrounded by side portion 22s, top portion 23, side portion 22t, and bed 12. Spindle head 41 is disposed so as to be slidable in the Z-axis direction that is parallel with the horizontal direction and is orthogonal to the X-axis direction.

Spindle head 41 has a spindle 42. Spindle 42 is provided so as to be rotatable by motor driving around a central axis 101 that is parallel with the Z-axis direction. Spindle 42 is equipped with a tool for machining a workpiece-to-be-machined. The tool attached to spindle 42 rotates around central axis 101 in accordance with rotation of spindle 42.

Bed 12, saddle 18, and spindle head 41 are appropriately provided with a feed mechanism, a guide mechanism, a servo motor as a driving source and the like for allowing a slide movement of saddle 18 in the X-axis direction and a slide movement of spindle head 41 in the Z-axis direction.

Table 26 is attached to column 21. Table 26 is provided so as to be slidable in the Y-axis direction that is parallel with the vertical direction and is orthogonal to the X-axis direction and the Z-axis direction relative to column 21.

Table 26 serves as a device for fixing a workpiece, and includes a palette 27 and a rotation mechanism unit 29 (29s, 29t).

Palette 27 is a metal-made mount, to which a workpiece is attached using various types of clamping mechanisms. Palette 27 is provided so as to be swivelable by rotation mechanism unit 29 around central axis 102 that is parallel to the X-axis (a-axis swiveling). Rotation mechanism units 29s and 29t are arranged at a distance from each other in the X-axis direction. Palette 27 is mounted between rotation mechanism units 29s and 29t. Furthermore, palette 27 may be arranged so as to be swivelable around the central axis that is orthogonal to the main surface of palette 27 (b-axis swiveling).

Column 21 and table 26 are appropriately provided with a feed mechanism, a guide mechanism, a servo motor as a driving source and the like for allowing a slide movement of table 26 in the Y-axis direction.

A slide movement of saddle 18 in the X-axis direction, a slide movement of spindle head 41 in the Z-axis direction, and a slide movement of table 26 in the Y-axis direction are combined, thereby allowing a three-dimensional movement of the machining position of the workpiece by the tool attached to spindle 42.

Horizontal machining center 10 further includes a magazine 30 and an automatic tool changer (ATC) 36. Magazine 30 serves as a device for housing a replacement tool 32 to be attached to spindle 42. ATC 36 serves as a device for replacing tools between spindle 42 and magazine 30.

Magazine 30 includes a magazine body portion 31, column members 14 and 16, and a mount member 33.

Magazine body portion 31 has a plurality of tool holding portions 34 and a sprocket 35. Tool holding portion 34 is configured so as to be capable of holding tool 32. The plurality of tool holding portions 34 are arranged annularly around sprocket 35. Sprocket 35 is provided so as to be rotatable by motor driving around a central axis 103 that is parallel to the Y-axis. The plurality of tool holding portions 34 are rotationally moved around central axis 103 in accordance with rotation of sprocket 35.

Magazine body portion 31 is supported by column members 14, 16 and mount member 33 at a position spaced apart from bed 12 in the vertically upward direction.

In accordance with rotation of sprocket 35, tool holding portion 34 holding a specific tool 32 is indexed to be located at a prescribed position on the front side of the machine. Specific tool 32 is conveyed in the Z-axis direction by a tool conveying device (not shown) and moved to a tool replacement position where tools are to be replaced. A double arm 37 provided in ATC 36 swivels, thereby replacing the tool mounted on spindle 42 with specific tool 32 conveyed to the tool replacement position.

Figure 2:
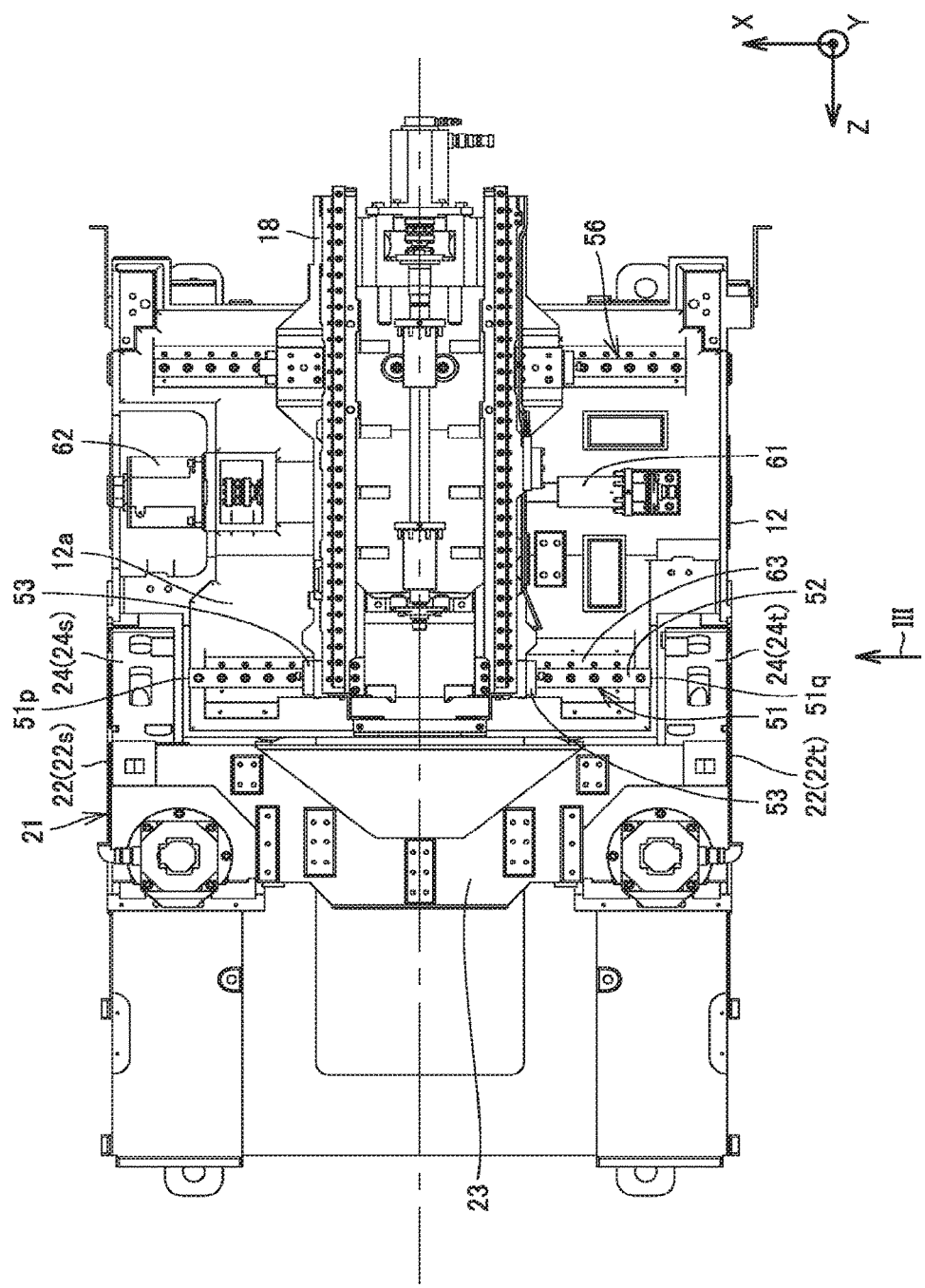
FIG. 2 is a plan view showing the horizontal machining center in FIG. 1.
Figure 3:
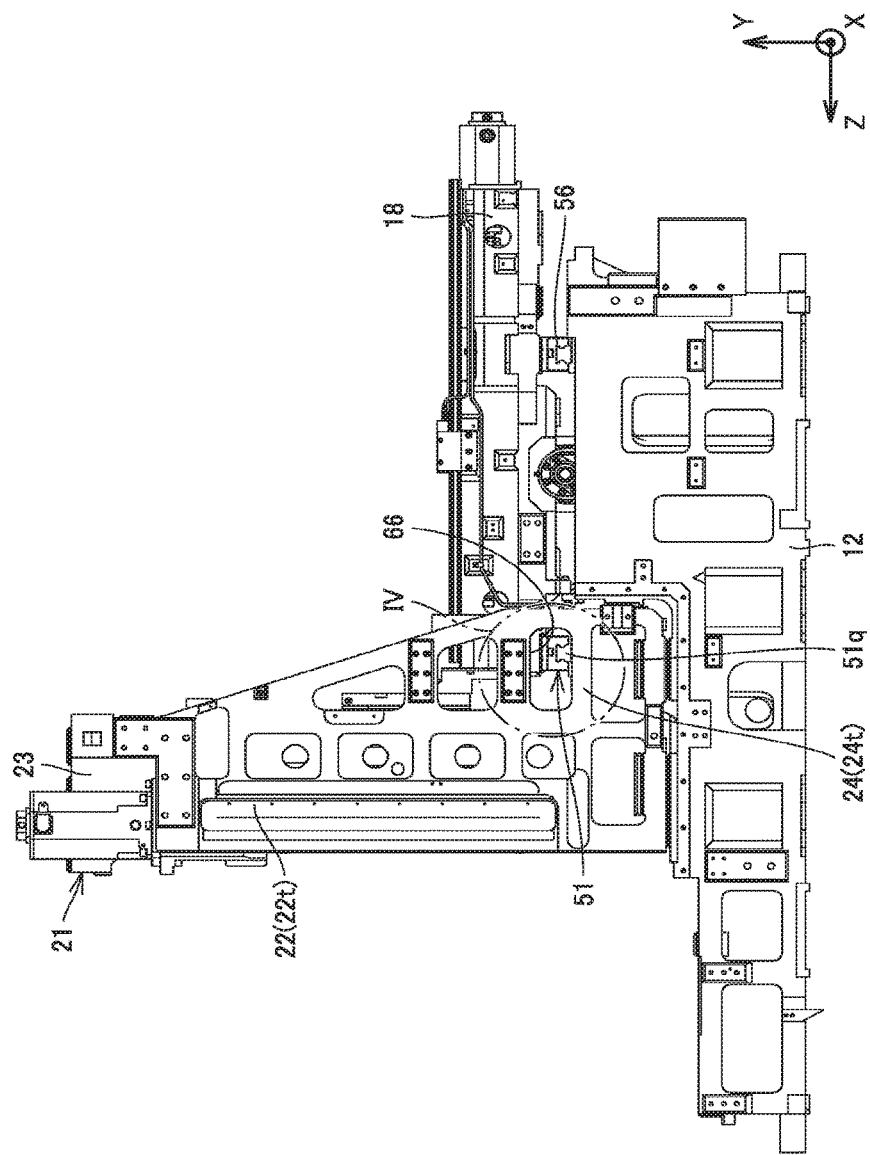
FIG. 3 is a side view showing the horizontal machining center as seen from the direction indicated by an arrow III in FIG. 2.

Then, the guide mechanism of saddle 18 and the structure for removing this guide mechanism will be hereinafter described in detail. FIG. 2 is a plan view showing the horizontal machining center in FIG. 1. FIG. 3 is a side view showing the horizontal machining center as seen from the direction indicated by an arrow III in FIG. 2. Each of these figures shows the state where spindle head 41, table 26, magazine 30, and ATC 36 have been removed.

Referring to FIGS. 2 and 3, horizontal machining center 10 further includes a front-side guide rail 51 and a rear-side guide rail 56. Front-side guide rail 51 and rear-side guide rail 56 each are provided as a guide mechanism that guides saddle 18 so as to be movable in the X-axis direction.

Front-side guide rail 51 and rear-side guide rail 56 are attached to bed 12. Front-side guide rail 51 and rear-side guide rail 56 are fastened to bed 12 with a plurality of bolts.

Bed 12 has an upper surface 12a. Upper surface 12a faces in the vertically upward direction. Upper surface 12a is arranged in the X-Z plane. Front-side guide rail 51 and rear-side guide rail 56 are elongate bodies formed to extend linearly along upper surface 12a. Front-side guide rail 51 and rear-side guide rail 56 are formed to entirely extend linearly in the X-axis direction.

Front-side guide rail 51 and rear-side guide rail 56 are spaced apart from each other in the Z-axis direction. Front-side guide rail 51 is arranged on the side close to table 26 in the Z-axis direction (on the front side of the machine) while rear-side guide rail 56 is arranged on the side away from table 26 in the Z-axis direction (on the rear side of the machine). A ball screw 61 serving as a feed mechanism of saddle 18 and a servo motor 62 serving as a driving source of ball screw 61 are provided between front-side guide rail 51 and rear-side guide rail 56 in the Z-axis direction.

Figure 4:
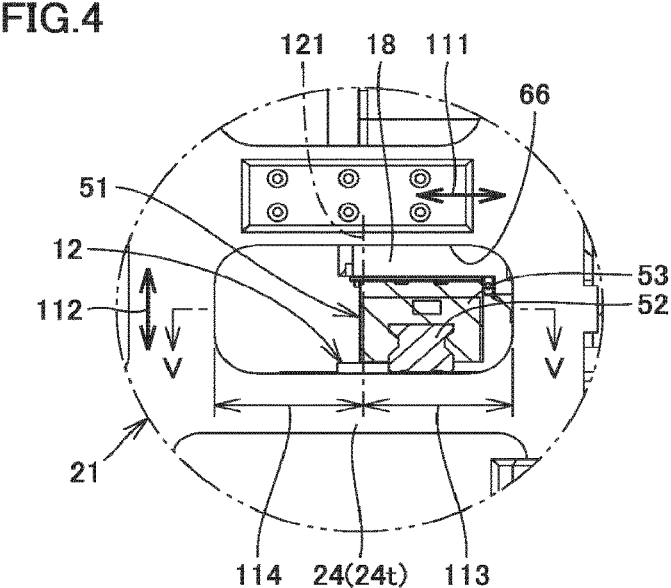
FIG. 4 is a side view showing, in an enlarged manner, an area surrounded by an alternate long and two short dashed line IV in FIG. 3.
Figure 5:
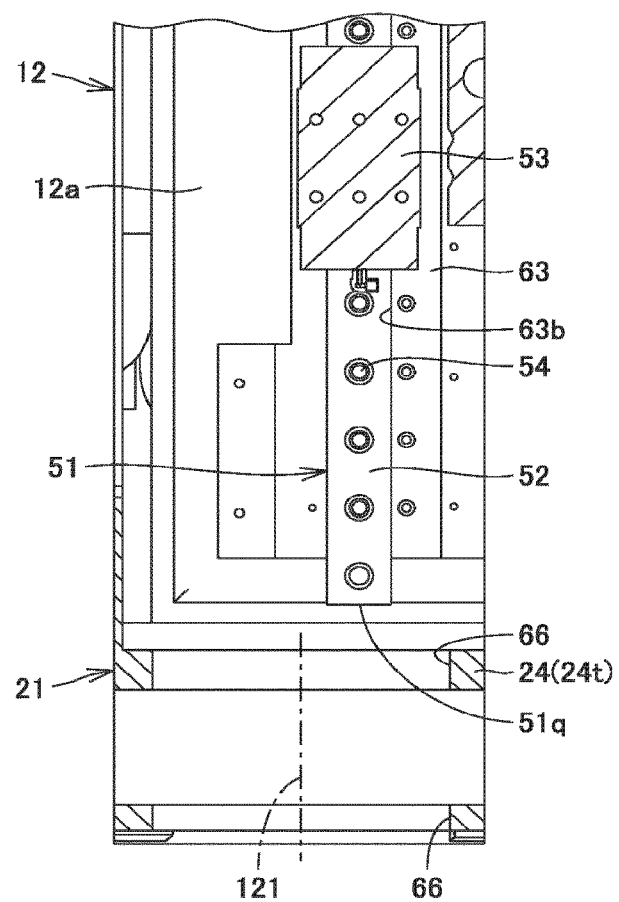
FIG. 5 is a cross-sectional view showing a machine tool taken along a line V-V in FIG. 4.

FIG. 4 is a side view showing, in an enlarged manner, an area surrounded by an alternate long and two short dashed line IV in FIG. 3. FIG. 5 is a cross-sectional view showing the machine tool taken along a line V-V in FIG. 4. Referring to FIGS. 2 to 5, front-side guide rail 51 has a rail 52 and a slider 53.

Rail 52 extends linearly in the X-axis direction. Rail 52 is fastened to bed 12 with a plurality of bolts 54 that are spaced apart from one another in the X-axis direction. Slider 53 is formed in a block shape and provided such that it can travel along rail 52. Saddle 18 is mounted on slider 53. A plurality of rolling elements (a ball or a roller) are interposed between rail 52 and slider 53. These rolling elements endlessly circulate in accordance with a slide movement of slider 53, so that slider 53 can travel. The weight of front-side guide rail 51 is 15 kg, for example.

Although the structure of front-side guide rail 51 has been representatively described in the above, rear-side guide rail 56 also has the same structure as that of front-side guide rail 51.

Front-side guide rail 51 has one end 51p and the other end 51q at both ends thereof in the X-axis direction. Side portion 22s and side portion 22t of column 21 are arranged at positions adjacent to one end 51p and the other end 51q, respectively, of front-side guide rail 51 in the X-axis direction. Side portion 22s and side portion 22t of column 21 are arranged at positions adjacent to one end 51p and the other end 51q, respectively, of front-side guide rail 51 in the Z-axis direction (on the front side of the machine). In other words, in a plan view shown in FIG. 2, column 21 is arranged in front-side guide rail 51 on the front side and the lateral side of the machine.

In general, there is a requirement for a machining center that the spindle needs to be supported at a position relatively close to the machining point in order to ensure mechanical rigidity. According to horizontal machining center 10 in the present embodiment, front-side guide rail 51 is disposed on the front side of the machine such that front-side guide rail 51 supporting saddle 18 is located close to the machining point. This consequently establishes the above-described relative positional relation between front-side guide rail 51 and column 21.

Column 21 has a facing portion 24 (24s, 24t). Facing portion 24 (24s, 24t) is a part of a side portion 22 (22s, 22t) of column 21. Facing portion 24 faces the end of front-side guide rail 51 in the X-axis direction. More specifically, a facing portion 24s faces one end 51p of front-side guide rail 51 with a gap provided therebetween while a facing portion 24t faces the other end 51q of front-side guide rail 51 with a gap provided therebetween.

Facing portions 24s and 24t each are provided with a hole 66 through which front-side guide rail 51 can be inserted. In the present embodiment, column 21 is formed by casting. Hole 66 is one of a plurality of cast holes provided in column 21.

Hole 66 is provided so as to penetrate through facing portion 24. As seen in the X-axis direction (the direction shown in FIG. 4), hole 66 is provided so as to overlap with front-side guide rail 51. Hole 66 may be provided so as to overlap with a part of front-side guide rail 51 or may be provided so as to overlap with the entire front-side guide rail 51.

As seen in the X-axis direction (the direction shown in FIG. 4), hole 66 has an aperture plane that is formed in a long hole shape having: a longitudinal direction that is relatively long (the direction indicated by an arrow 111 in FIG. 4); and a short direction that is relatively short (the direction indicated by an arrow 112 in FIG. 4). The longitudinal direction of the aperture plane of hole 66 extends in the direction along upper surface 12*a* of bed 12. The short direction of the aperture plane of hole 66 extends in the direction in which the distance from upper surface 12*a* of bed 12 changes. More specifically, the longitudinal direction of the aperture plane of hole 66 extends in the Z-axis direction (the horizontal direction) while the short direction of the aperture plane of hole 66 extends in the Y-axis direction (the vertical direction).

Although FIG. 4 shows an approximately rectangular aperture plane with rounded corners as a shape of hole 66, this shape of hole 66 is not particularly limited thereto as long as it has a shape (size) through which front-side guide rail 51 can be inserted. For example, hole 66 may have an aperture plane having a horizontally-long elliptical shape. Hole 66 may be provided by machining.

As seen in the X-axis direction (the direction shown in FIG. 4), front-side guide rail 51 is arranged at a position that is shifted to one side from a center portion of hole 66 in the longitudinal direction of the aperture plane of hole 66. In FIG. 4, the center portion of hole 66 in the longitudinal direction of the aperture plane of hole 66 is shown by a center line 121. In this case, assuming that one side with respect to center line 121 is defined as a first range 113 and the other side with respect to center line 121 is defined as a second range 114, front-side guide rail 51 is disposed at a position that is shifted more to first range 113 than to second range 114.

A positioning block 63 is further fastened onto upper surface 12*a* of bed 12. Positioning block 63 has a side surface 63*b* that extends in the X-axis direction. Rail 52 is brought into contact with side surface 63*b*, thereby positioning rail 52 relative to bed 12. As seen in the X-axis direction (the direction shown in FIG. 4), positioning block 63 is arranged at a position that is shifted more to first range 113 than to second range 114. In other words, front-side guide rail 51 is arranged on the side on which positioning block 63 is arranged (on the first range 113-side) with respect to center line 121 in the longitudinal direction of the aperture plane of hole 66.

Figure 6:
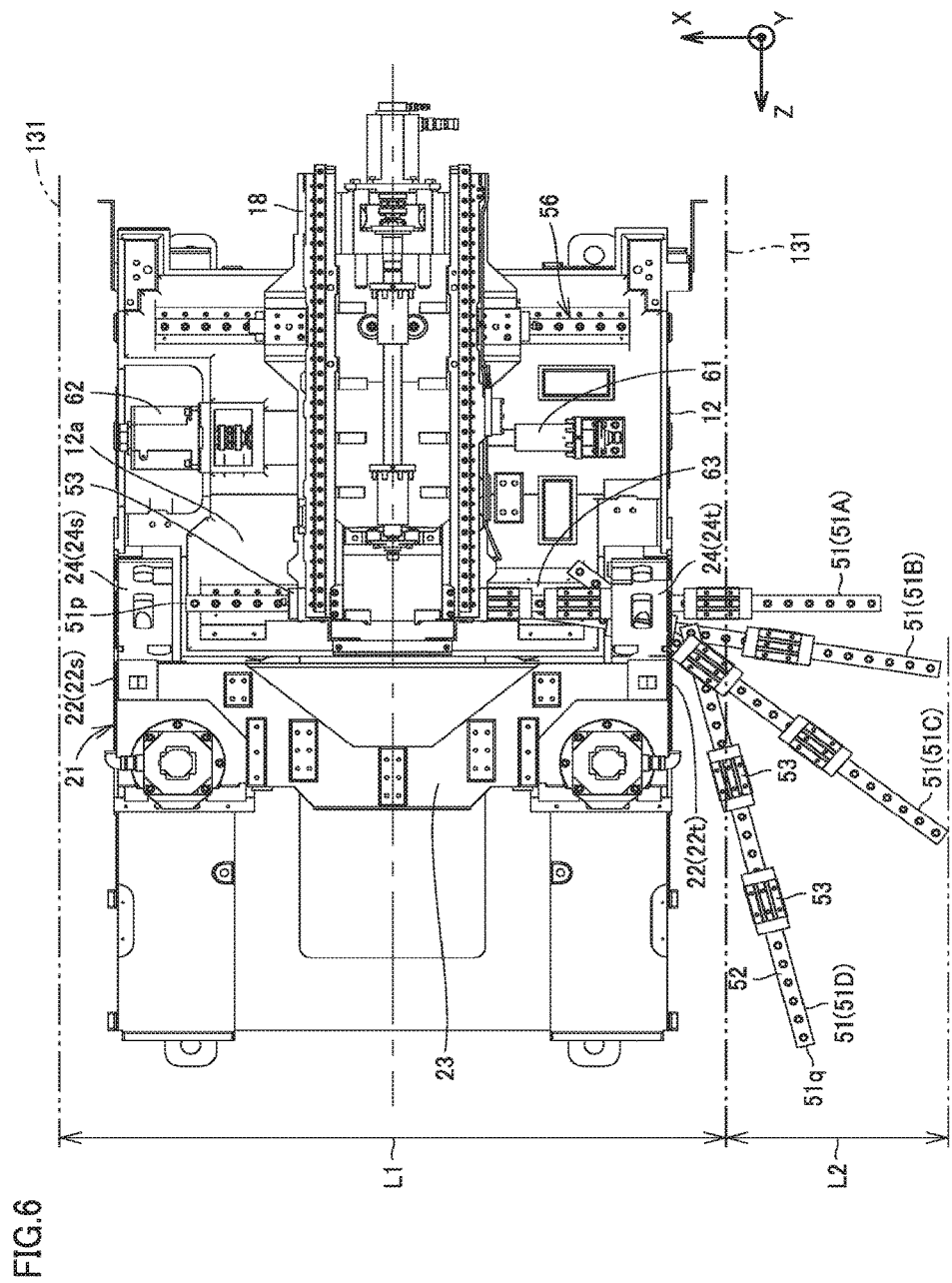
FIG. 6 is a plan view showing the step of removing a front-side guide rail in the machine tool in FIG. 1.
Figure 7:
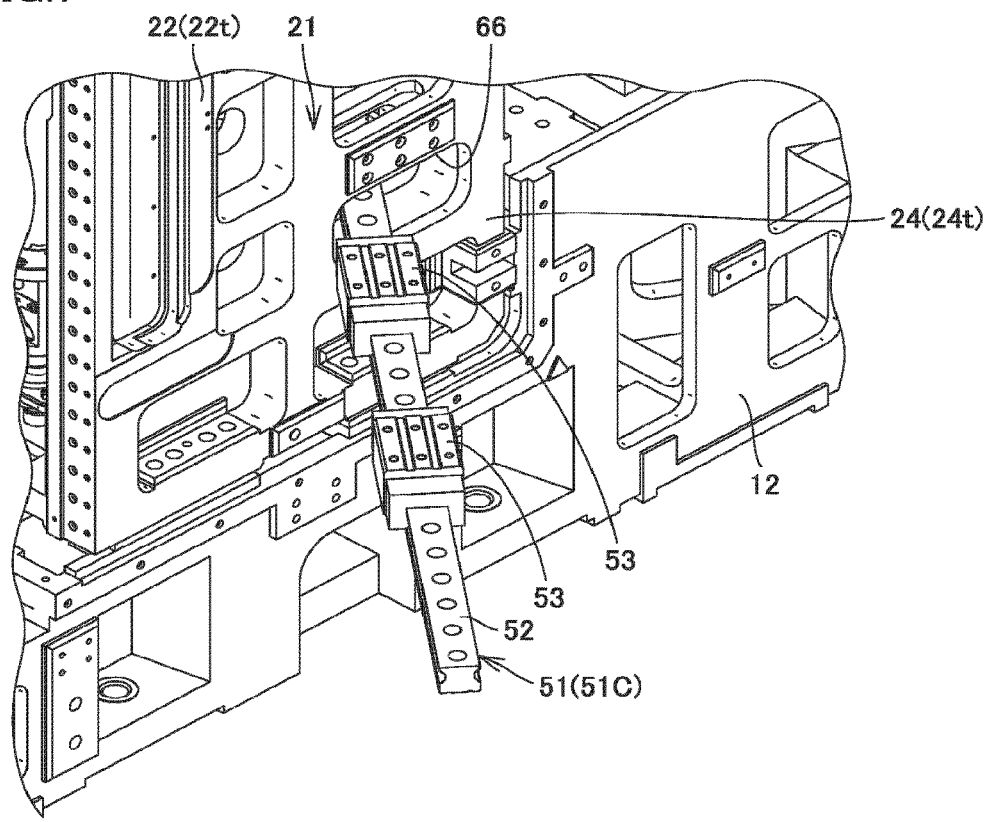
FIG. 7 is a perspective view showing the step of removing the front-side guide rail in the machine tool in FIG. 1.

FIG. 6 is a plan view showing the step of removing the front-side guide rail in the machine tool in FIG. 1. FIG. 7 is a perspective view showing the step of removing the front-side guide rail in the machine tool in FIG. 1.

Referring to FIGS. 1 to 7, front-side guide rail 51 may need to be replaced during maintenance of horizontal machining center 10. The following is an explanation about the step of removing front-side guide rail 51 in such a case.

First, a plurality of bolts 54 are removed except for bolts 54 located at both ends of rail 52. Then, saddle 18 and the nut of ball screw 61 are disengaged from each other.

Then, a pipe line for lubricating oil that leads to slider 53 of front-side guide rail 51 is removed. Then, saddle 18 and slider 53 of front-side guide rail 51 are disengaged from each other. Then, bolts 54 remaining at both ends of rail 52 of front-side guide rail 51 are removed, thereby disengaging rail 52 and bed 12 from each other.

Then, a jack is placed between upper surface 12*a* of bed 12 and saddle 18. In this case, the jack is arranged in the vicinity of front-side guide rail 51. The jack is used to lift up saddle 18 to such a degree that front-side guide rail 51 can be pulled out.

Then, front-side guide rail 51 is removed from bed 12 through hole 66. In the present embodiment, facing portion 24 of column 21 is provided with hole 66 through which front-side guide rail 51 can be inserted. Accordingly, front-side guide rail 51 can be removed without having to remove peripheral components of front-side guide rail 51. This allows excellent workability during removal of front-side guide rail 51.

Also in the present embodiment, hole 66 is provided so as to overlap with front-side guide rail 51 as seen in the X-axis direction. Such a configuration allows further more excellent workability during removal of front-side guide rail 51, in which case, for example, only slight lifting-up of saddle 18 is needed.

Also in the present embodiment, the aperture plane of hole 66 is formed in a long hole shape that has a longitudinal direction extending along upper surface 12*a*. Furthermore, front-side guide rail 51 is arranged in first range 113 that is shifted to one side from a center portion of hole 66 in the longitudinal direction.

By such a configuration, front-side guide rail 51 is inserted through hole 66 while being swiveled in the state where this front-side guide rail 51 is maintained in a posture extending along upper surface 12*a* of bed 12. In this case, the position of hole 66 through which front-side guide rail 51 passes is gradually shifted from first range 113 to second range 114 (in FIG. 6, front-side guide rail 51A→front-side guide rail 51B→front-side guide rail 51C→front-side guide rail 51D), thereby allowing front-side guide rail 51 to be readily swivelably moved without causing this front-side guide rail 51 to interfere with the inner wall of hole 66.

Front-side guide rail 51 is caused to pass through hole 66 while being swiveled, so that the space required during removal of front-side guide rail 51 can be reduced. FIG. 6 shows a cover line 131 of horizontal machining center 10. For example, in horizontal machining center 10 having an entire width L1 of 1700 mm, a width L2 of the side surface space that is required during removal of front-side guide rail 51 can be reduced to a length of 600 mm.

Hole 66 only has to be provided in at least one of facing portions 24*s* and 24*t*. In the present embodiment, hole 66 is provided in each of facing portions 24*s* and 24*t*. Accordingly, the direction in which front-side guide rail 51 is removed can be selected in consideration of the free space on both sides of horizontal machining center 10.

The following is a summary of the structure of horizontal machining center 10 in the embodiment of the present invention as described above. Specifically, horizontal machining center 10 as a machine tool in the present embodiment includes: a bed 12 as a base member having an upper surface 12*a* as a main surface; a front-side guide rail 51 as an elongate body that is shaped to extend linearly along upper surface 12*a* and attached to bed 12; and a column 21 as a structure body that is provided on upper surface 12*a* and fixed to bed 12. Column 21 has a facing portion 24 arranged so as to face an end of front-side guide rail 51 in the X-axis direction defined as a prescribed direction in which front-side guide rail 51 linearly extends. Facing portion 24 is provided with a hole 66 through which front-side guide rail 51 can be inserted.

Horizontal machining center 10 in the embodiment of the present invention that is configured as described above allows excellent workability during removal of front-side guide rail 51.

In addition, although an explanation has been given in the present embodiment with regard to the case where the elongate body in the present invention corresponds to front-side guide rail 51, the elongate body is not limited to such a configuration, but for example may be a ball screw as a feed mechanism of a movable body, a scale for detecting the position of each axis, and the like. Furthermore, the machine tool to which the present invention is applicable is not limited to a horizontal machining center, but for example may be a lathe, or a combined processing machine having a lathe turning function and a milling function.

The machine tool according to the present invention includes: a base member having a main surface; an elongate body shaped to extend linearly along the main surface and attached to the base member; and a structure body provided on the main surface and fixed to the base member. The structure body has a facing portion arranged to face an end of the elongate body in a prescribed direction in which the elongate body linearly extends. The facing portion is provided with a hole through which the elongate body can be inserted.

According to the machine tool configured in this way, the elongate body can be removed from the base member through the hole provided in the facing portion. This allows excellent workability during removal of the elongate body.

Further preferably, the machine tool further includes a movable body provided on the main surface. The elongate body is a linear-motion guide mechanism unit that guides the movable body so as to be movable in the prescribed direction. The facing portion includes a first facing portion and a second facing portion that are arranged to face one end and the other end, respectively, of the elongate body in the prescribed direction. The first facing portion and the second facing portion each are provided with the hole.

According to the machine tool configured in this way, the linear-motion guide mechanism unit can be removed from the base member through the hole provided in the first facing portion or the second facing portion.

Further preferably, the structure body is formed by casting. The hole provided in the facing portion is a cast hole.

According to the machine tool configured in this way, the cast hole provided in the facing portion is utilized as a hole through which the elongate body is caused to pass.

Further preferably, the hole is provided so as to overlap with the elongate body as seen in the prescribed direction in which the elongate body linearly extends.

According to the machine tool configured in this way, the hole is located along an imaginary line extended from the elongate body in the prescribed direction, thereby allowing further more excellent workability during removal of the elongate body.

Further preferably, the hole has an aperture plane formed in a long hole shape having a longitudinal direction extending along the main surface as seen in the prescribed direction in which the elongate body linearly extends.

According to the machine tool configured in this way, when the elongate body is inserted through the hole, the elongate body can be swiveled in the state where this elongate body is maintained in a posture extending along the main surface. Thereby, the space required during removal of the elongate body can be reduced.

Further preferably, the elongate body is arranged at a position that is shifted to one side from a center portion of the hole in the longitudinal direction as seen in the prescribed direction in which the elongate body linearly extends.

According to the machine tool configured in this way, the elongate body can be swiveled while the position of the hole through which the elongate body passes is being shifted from one side to the other side with respect to the center portion of the hole in the longitudinal direction. This allows further more excellent workability during removal of the elongate body.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:
1. A machine tool comprising:
a base member having a main surface;
an elongate body shaped to extend linearly along the main surface and attached to the base member; and
a structure body provided on the main surface and fixed to the base member,
the structure body having a first facing portion and a second facing portion,
the elongate body being arranged between the first facing portion and the second facing portion,
at least one of the first facing portion and the second facing portion being provided with a hole having a size through which the elongate body can be inserted and penetrating through the at least one of the first facing portion and the second facing portion,
the hole forming an aperture plane that faces at least part of the elongate body with a gap provided therebetween in a prescribed direction in which the elongate body linearly extends,
as seen in the prescribed direction, the aperture plane having a first direction of a longer dimension and a second direction of a shorter dimension, the first direction extending along the main surface and having a first length, the second direction being orthogonal to the main surface and having a second length shorter than the first length,
the elongate body being arranged at a position that is shifted to one side from a center portion of the aperture plane in the first direction as seen in the prescribed direction, and
the elongate body being the only elongate body that is arranged with the hole as seen in the prescribed direction.

2. The machine tool according to claim 1, further comprising a movable body provided on the main surface, wherein
the elongate body is a linear-motion guide mechanism unit that guides the movable body so as to be movable in the prescribed direction,
the first facing portion and the second facing portion are arranged to face one end and the other end, respectively, of the elongate body in the prescribed direction, and
the first facing portion and the second facing portion each are provided with the hole.

3. The machine tool according to claim 1, wherein the structure body is formed by casting, and the hole is a cast hole.

4. The machine tool according to claim 1, wherein the hole is provided so as to overlap with the end of the elongate body as seen in the prescribed direction.

* * * * *